United States Patent
Unno

(10) Patent No.: US 10,044,902 B2
(45) Date of Patent: Aug. 7, 2018

(54) PRINTING APPARATUS CONNECTED TO A SADDLE FINISHER WITH IMAGE FORMING CONTROLLED BASED ON A TRANSPARENCY OF A COVER SHEET

(71) Applicant: CANON KABUSHIKI KAISHA, Tokyo (JP)

(72) Inventor: Koichi Unno, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/493,448

(22) Filed: Apr. 21, 2017

(65) Prior Publication Data
US 2017/0223215 A1 Aug. 3, 2017

Related U.S. Application Data

(63) Continuation of application No. 15/071,070, filed on Mar. 15, 2016, now Pat. No. 9,667,830.

(30) Foreign Application Priority Data

Apr. 1, 2015 (JP) .................................. 2015-075469

(51) Int. Cl.
*G06F 15/00* (2006.01)
*H04N 1/32* (2006.01)
(Continued)

(52) U.S. Cl.
CPC ......... *H04N 1/3247* (2013.01); *G06K 15/023* (2013.01); *H04N 1/0032* (2013.01);
(Continued)

(58) Field of Classification Search
CPC ............... H04N 1/3247; H04N 1/0032; H04N 1/00631; H04N 1/00639;
(Continued)

(56) References Cited

U.S. PATENT DOCUMENTS 6,632,035 B1  10/2003  Kawamoto
6,868,253 B2   3/2005  Ueda et al.
(Continued)

FOREIGN PATENT DOCUMENTS

JP          05-35151 A      2/1993

*Primary Examiner* — Gabriel Garcia
(74) *Attorney, Agent, or Firm* — Fitzpatrick, Cella, Harper & Scinto

(57) ABSTRACT

A printing apparatus in which a controller controls an image forming unit. When a cover sheet is a first type of sheet, a normal image is formed on the cover sheet after forming the image on a body sheet and the cover sheet is conveyed to a saddle finisher without reversing the cover sheet. When the cover sheet has a higher transparency than the first type of sheet and is able to be reversed, a mirror image is formed on the cover sheet after forming the image on the body sheet. When the cover sheet is a third type of sheet having a higher transparency than the first type of sheet and is not able to be reversed by the reversing mechanism, a normal image is formed on the cover sheet after forming the image on the body sheet and the cover sheet on which the normal image has been formed is conveyed to the saddle finisher without reversing the cover sheet.

12 Claims, 17 Drawing Sheets

(51) Int. Cl.
*H04N 1/00* (2006.01)
*G06K 15/02* (2006.01)
*G06F 3/12* (2006.01)

(52) U.S. Cl.
CPC ..... *H04N 1/00631* (2013.01); *H04N 1/00639* (2013.01); *H04N 2201/0094* (2013.01)

(58) Field of Classification Search
CPC ........... H04N 2201/0094; G06K 15/16; G06K 15/023; G06K 15/404; B42D 9/00
USPC ................................. 358/496, 494
See application file for complete search history.

(56) References Cited

U.S. PATENT DOCUMENTS

| | | | |
|---|---|---|---|
| 8,711,421 | B2 | 4/2014 | Katayama |
| 9,667,830 | B2* | 5/2017 | Unno .................. G06K 15/023 |
| 2013/0328258 | A1 | 12/2013 | Mutsuno |
| 2014/0153937 | A1 | 6/2014 | Unno |
| 2015/0277321 | A1* | 10/2015 | Nonaka .................. G03G 15/50 |
| | | | 399/82 |
| 2016/0034800 | A1 | 2/2016 | Unno |
| 2016/0065753 | A1* | 3/2016 | Tachibana ............... G06F 3/121 |
| | | | 358/1.14 |

\* cited by examiner

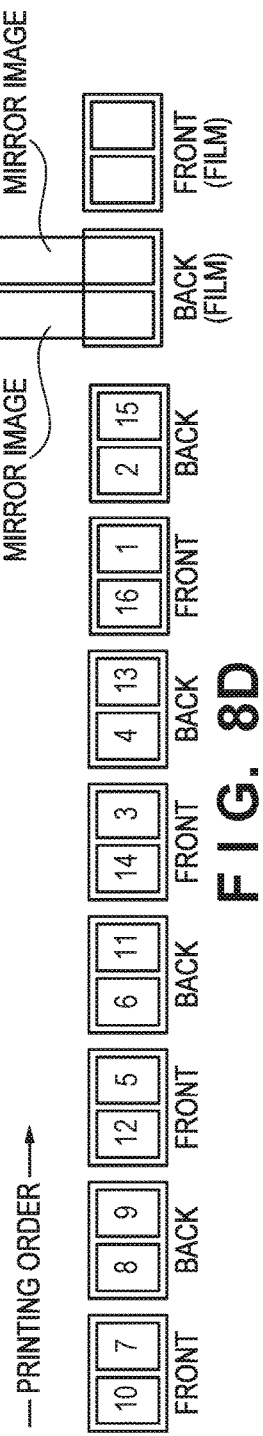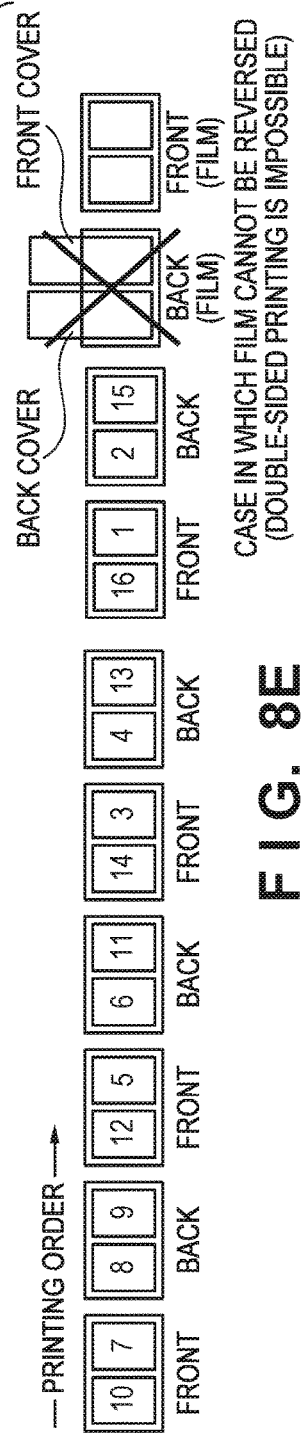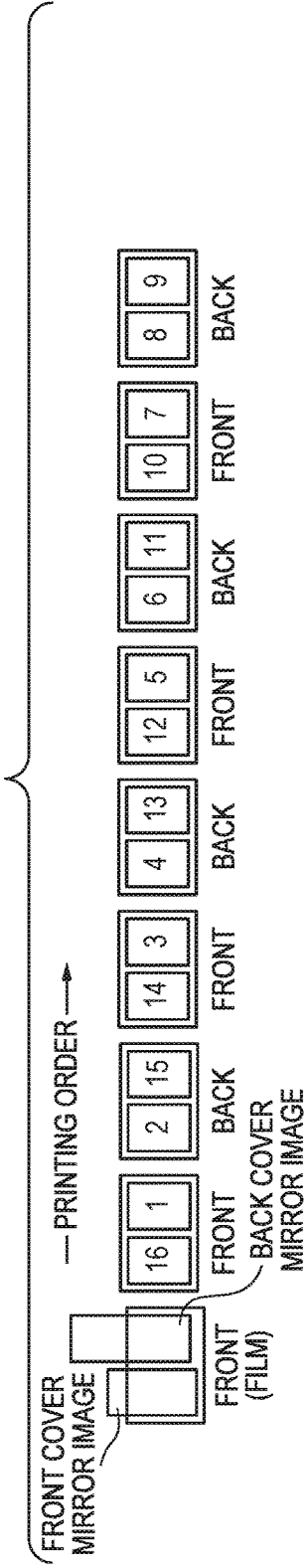

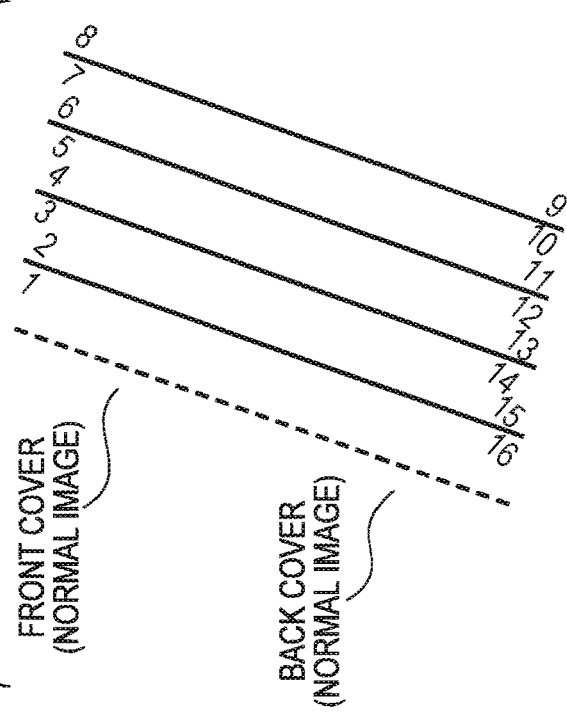
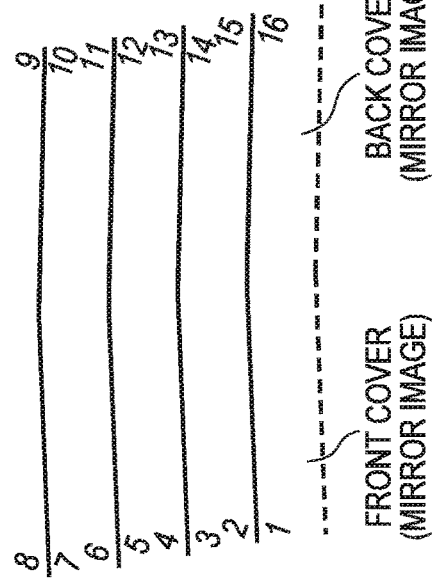
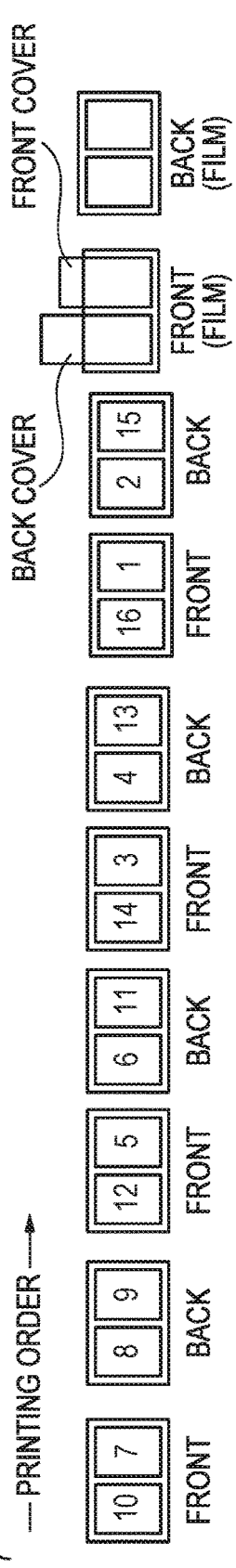

FIG. 9A

| SHEET FEED SOURCE | STANDARD-SIZE | MAIN-SCANNING SIZE | SUB-SCANNING SIZE | PAPER TYPE ID |
|---|---|---|---|---|
| 1 | A4 | 297.0 | 210.0 | 1 |
| 2 | A3 | 297.0 | 420.0 | 4 |
| MANUAL FEED | A4 | 297.0 | 210 | 3 |

FIG. 9B

| PAPER TYPE ID | NAME | GRAMMAGE | SURFACE PROPERTY | SHAPE | COLOR |
|---|---|---|---|---|---|
| 1 | PLAIN PAPER(64~90g/m²) | 80 | HIGH QUALITY PAPER | STANDARD | 1:WHITE |
| 2 | RECYCLED PAPER(64~90g/m²) | 80 | RECYCLED PAPER | STANDARD | 1:WHITE |
| 3 | PUNCHED SHEET(64~90g/m²) | 70 | HIGH QUALITY PAPER | PUNCH | 1:WHITE |
| 4 | FILM(151~180g/m²) | 70 | FILM | STANDARD | 0:TRANSPARENT |
| 5 | SECOND ORIGINAL DRAWING(64~90g/m²) | 70 | DOUBLE-SIDED COATED PAPER | STANDARD | 1:WHITE |
| 6 | LABELED PAPER(151~180g/m²) | 200 | LABEL | STANDARD | 1:WHITE |
| ... | | | | | |

FIG. 9C

| PAPER INFORMATION | | FEED DETERMINING INFORMATION | | | DISCHARGE PROCESSING INFORMATION | |
|---|---|---|---|---|---|---|
| | | CASSETTE 1 | CASSETTE 2 | MANUAL FEED | DOUBLE-SIDE | REVERSE AND DISCHARGE |
| HIGH QUALITY PAPER | A4 | ○ | ○ | ○ | ○ | ○ |
| | A3 | ○ | ○ | ○ | ○ | ○ |
| RECYCLED PAPER | A4 | ○ | ○ | ○ | ○ | ○ |
| | A3 | ○ | ○ | ○ | ○ | ○ |
| DOUBLE-SIDED COATED PAPER | A4 | × | ○ | ○ | × | × |
| | A3 | × | ○ | ○ | × | × |
| FILM | A4 | × | ○ | ○ | × | × |
| | A3 | × | ○ | ○ | × | × |

PRINTING APPARATUS CONNECTED TO A SADDLE FINISHER WITH IMAGE FORMING CONTROLLED BASED ON A TRANSPARENCY OF A COVER SHEET

This application is a continuation of application Ser. No. 15/071,070, filed Mar. 15, 2016.

BACKGROUND OF THE INVENTION

Field of the Invention

The present invention relates to a print system, a printing apparatus and a method of controlling the same, and a storage medium.

Description of the Related Art

Conventionally, by performing post processing on printed materials printed by a copying machine or the like, improvement of usability or visual quality of that printed materials has been performed. In such post processing, for example there is stapling processing that opens a punch hole in the printed materials and causes it to be closed by a binder. In addition, there are bookbinding processes in such post processing, and in such bookbinding processes there are those that, for example, book-bind by saddle stitching printed sheets that have been laid-out for bookbinding.

In addition, there is demand for increasing sheet types that can be used in printing and post processing to improve usability or visual quality of printed materials, and for example it is possible to use, as a printing sheet, a transparent film or coated sheet whose front surface has been coated. For example, Japanese Patent Laid-Open No. H05-35151 discloses that an OHP sheet, on which a mirror image of an original image has been printed, and inserting paper, on which a normal image of the original image has been printed, are overlapped, and an image of the OHP sheet can be visually observed as an erected image of the original image from a back surface side of the OHP sheet, and if the OHP sheet is turned up, an image on inserting paper can be visually observed unchanged as the erected image of the original image.

By applying this technique, to improve visual quality of a printed material a transparent film is used on a front cover, a back cover, inserting paper, or the like of the printed material, an image of the front cover is printed in a mirror image on the back surface thereof, and the image of the front cover is made to be visible through the transparent film if seen from the perspective of a front surface of the film. Thus improving the visual quality of a front cover or a back cover, and making a bookbinding product resistant to dirtying is being considered.

However, when using a transparent film on a front cover, because such a transparent film is hard to bend, there are cases in which it cannot be reversed in a printing apparatus and discharged. Accordingly, when printing a front cover, a situation arises in which the printing cannot be performed when printing of a mirror image on a back surface is attempted by causing the transparent film to be reversed. To avoid this, there is a need to print an image of a front cover in a normal image on a front surface of the transparent film that is used as the front cover, but this leads to the visual quality suffering because a print face becomes a front side of the transparent film.

SUMMARY OF THE INVENTION

An aspect of the present invention is to eliminate the above-mentioned problems with conventional technology.

A feature of the present invention is to provide a technique for maintaining visual quality of a bookbinding product by changing, in accordance with a type of a sheet to use as a front cover for a bookbinding, a print order of image data of a body and the front cover, and a discharge method of sheets on which the front cover and the body have been printed.

The present invention, in its first aspect, provides a printing apparatus, comprising a reversing unit configured to reverse a front and back of a printed sheet and then discharge the sheet, a determination unit configured to determine, upon receiving print data for bookbinding that includes image data of a front cover and a body, whether or not a sheet on which image data of the front cover is to be printed is a particular sheet, and a control unit configured, when the determination unit determines that the sheet on which the image data of the front cover is to be printed is the particular sheet, to control to execute by switching between (i) a first control that prints on sheets image data of the body in an order from an end of the body toward a head of the body, discharges the printed sheets without reversing by the reversing unit, finally prints the image data of the front cover on the particular sheet, and discharges the particular sheet without reversing by the reversing unit, and (ii) a second control that firstly prints a mirror image of the image data of the front cover on the particular sheet, discharges the particular sheet without reversing by the reversing unit, next prints on sheets the image data of the body in an order from the head of the body toward the end of the body, reverses sheets on which the body has been printed by the reversing unit and discharges the reversed printed sheets.

The present invention, in its second aspect, provides a method of controlling a printing apparatus, comprising reversing a front and back of a printed sheet and then discharging the sheet; determining, upon receiving print data for bookbinding that includes image data of a front cover and a body, whether or not a sheet on which image data of the front cover is to be printed is a particular sheet, and, when it is determined that the sheet on which the image data of the front cover is to be printed is the particular sheet, controlling to execute by switching between (i) a first control that prints on sheets image data of the body in an order from an end of the body toward a head of the body, discharges the printed sheets without reversing, finally prints the image data of the front cover on the particular sheet, and discharges the particular sheet without the reversing, and (ii) a second control that firstly prints a mirror image of the image data of the front cover on the particular sheet, discharges the particular sheet without the reversing, next prints on sheets the image data of the body in an order from the head of the body toward the end of the body, reverses sheets on which the body has been printed by the reversing and discharges the reversed printed sheets.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 8A-8H depict views for explaining an overview of the present embodiment.

FIGS. 9A-9C depict views for explaining sheet information held by the copying machine according to the embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that in the following embodiments, explanation is given of a copying machine as an example of a printing apparatus according to the present invention, but the present invention is not limited to such a copying machine, and may be a printing apparatus (a printer) that receives and prints print data from a multi-function peripheral (multi-function peripheral), a PC, or the like.

Figure 1:
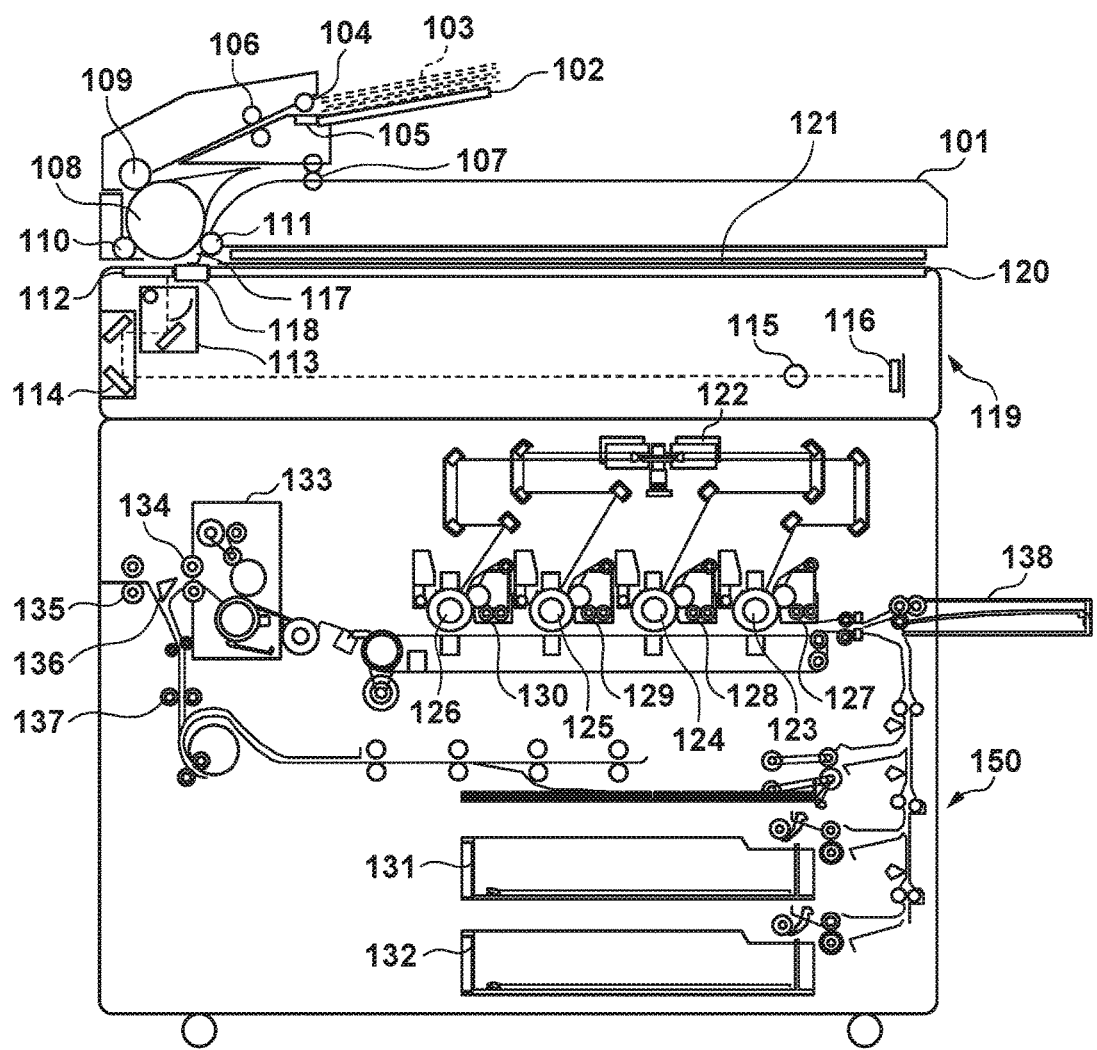
FIG. 1 depicts a cross-sectional view for explaining a structure of a copying machine according to an embodiment of the present invention.

FIG. 1 depicts a cross-sectional view for explaining a structure of a copying machine according to an embodiment of the present invention.

In a tray 102 of a document feeder 101, originals 103 that are reading targets are stacked, and an original is conveyed one sheet at a time to a document reader (scanner) 119, and is flow read. Explaining in detail, a feed roller 104 is configured to pair with a separation pad 105, and the original 103 is fed one sheet at a time on the tray 102. The original 103 thus fed is conveyed into the scanner 119 by an intermediate roller pair 106, is sandwiched by a large roller 108 and a first driven roller 109, and conveyed by the rotations of these. It is further sandwiched by the large roller 108 and a second driven roller 110, and conveyed along a rotation direction of the large roller 108 by the rotation of these rollers. The original 103 thus conveyed passes a flow reading original glass 112, a jump stand 118, and an original guide plate 117, and is conveyed by the large roller 108 and a third driven roller 111. Thus, when the original 103 passes above the flow reading original glass 112, an original surface in contact with the flow reading original glass 112 is exposed by an exposure unit 113, and reflected light thereof is reflected by a mirror unit 114 and sent to a lens 115. By converting light thus passing through the lens 115 and focused into an electrical signal by a CCD sensor unit 116, an image signal of an image of the original 103 is obtained. The original 103, for which an image was thus read, is discharged from the scanner 119 by an original discharge roller pair 107. Note that, between the flow reading original glass 112 and the original guide plate 117, the original 103 is conveyed in a form that follows the original guide plate 117 and contacts the flowing document reading glass 112.

In addition, it is also possible to read an original 121 for which copying is desired by a user placing the original 121 on a platen glass 120 and pressing a start button of a console unit 330 (FIG. 5), and the exposure unit 113 moving in a leftward/rightward orientation (a sub-scanning direction) of FIG. 1.

Next, explanation is given of a configuration of a printer unit 150.

The printer unit 150 converts image data into a laser beam by a laser unit 122, and by the laser beam emitted from the laser unit 122, forms electrostatic latent images of images corresponding to each color on photosensitive drums 123-126. Note that, based on image signals of Y (yellow), M (magenta), C (cyan), and BK (black), the photosensitive drums 123-126 are used to form images corresponding to respective colors. The electrostatic latent images thus formed on each photosensitive drum are formed, by toner of each color supplied from developing units 127-130, into toner images respectively corresponding to each color. These toner images are transferred in sequence to a sheet fed from a feed cassette 131 or 131, or a manual feed tray 138, and ultimately a color image is formed. Note that the developing unit 127 supplies Y (yellow) toner, the developing unit 128 supplies M (magenta) toner, the developing unit 129 supplies C (cyan) toner, and the developing unit 130 supplies BK (black) toner. After being sent to a fixing unit 133 and being fixed, the sheet to which the color image is thus transferred is discharged by rotation of conveyance roller pairs 134 and 135 from the apparatus or to a connected finisher 200 of FIG. 2. At this point, by performing reversal control of the sheet by conveyance roller pairs 134, 135, and 137 and a flapper 136, it is possible to switch between discharging the sheet in a state in which a print face is upward or discharging the sheet in a state in which the print face is downward.

Figure 2:
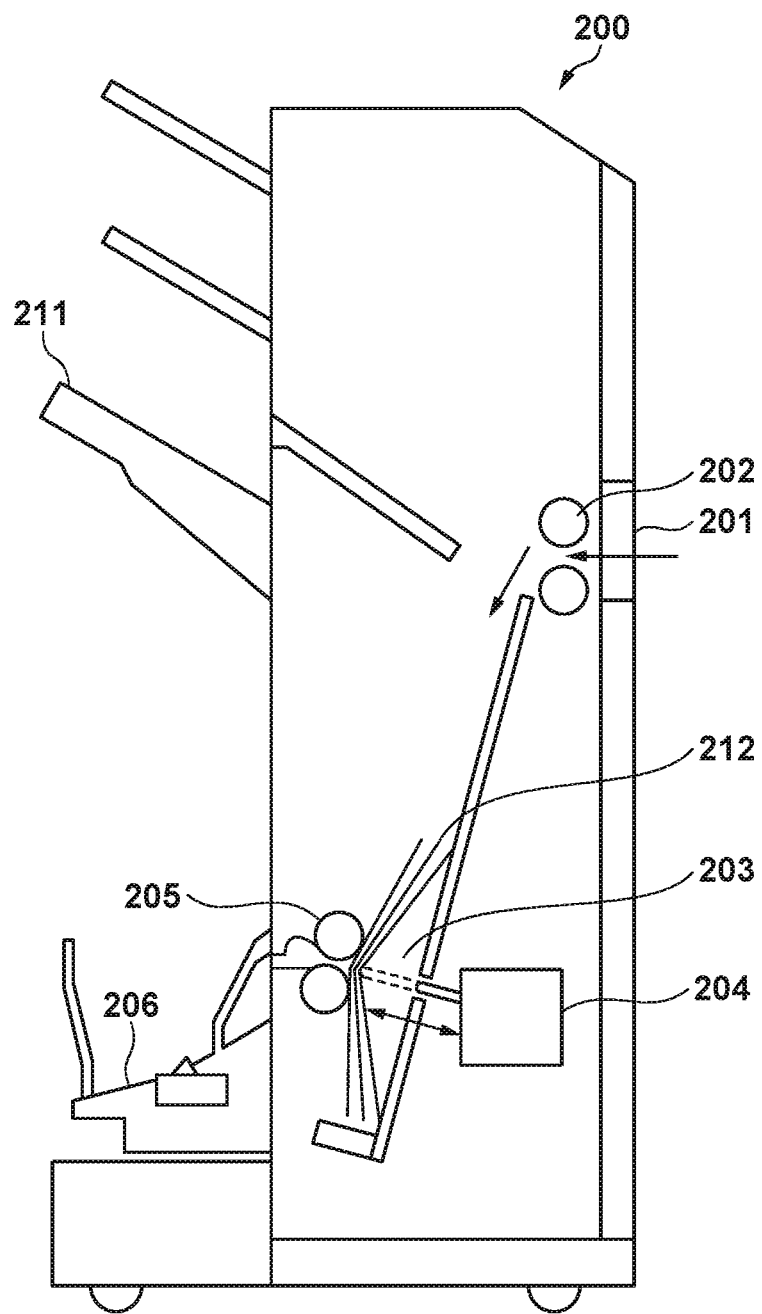
FIG. 2 depicts a cross-sectional view for explaining a structure of a finisher according to an embodiment.

FIG. 2 depicts a cross-sectional view for explaining a structure of the finisher (post-processing apparatus) 200 according to the embodiment. The finisher 200 is connected to the copying machine of FIG. 1 to form a print system, and receives the sheet printed by the copying machine and executes post processing (here, bookbinding processing) thereon.

The finisher 200 receives the sheet discharged from the copying machine of FIG. 1 via a conveyance port 201, and stacks it as a sheet bundle 212 on a stacking unit 203 by a conveyance roller 202. With respect to the sheet bundle 212 thus stacked on the stacking unit 203, saddle stitching processing is performed by pressing, by a protrusion member 204, a center of sheets into a folding roller 205. A sheet bundle thus saddle stitching processed is discharged to a tray 206 by a discharge roller 205. An output tray 211 is used to discharge sheets for which the bookbinding processing is not performed. Here, because the finisher 200 according to the embodiment realizes saddle stitching processing by a mechanism as previously described, when saddle stitching processing, it is necessary for the copying machine to print from a sheet that is the last to be bookbound, and to discharge a printed sheet whose front surface is facing upward.

Figure 3:
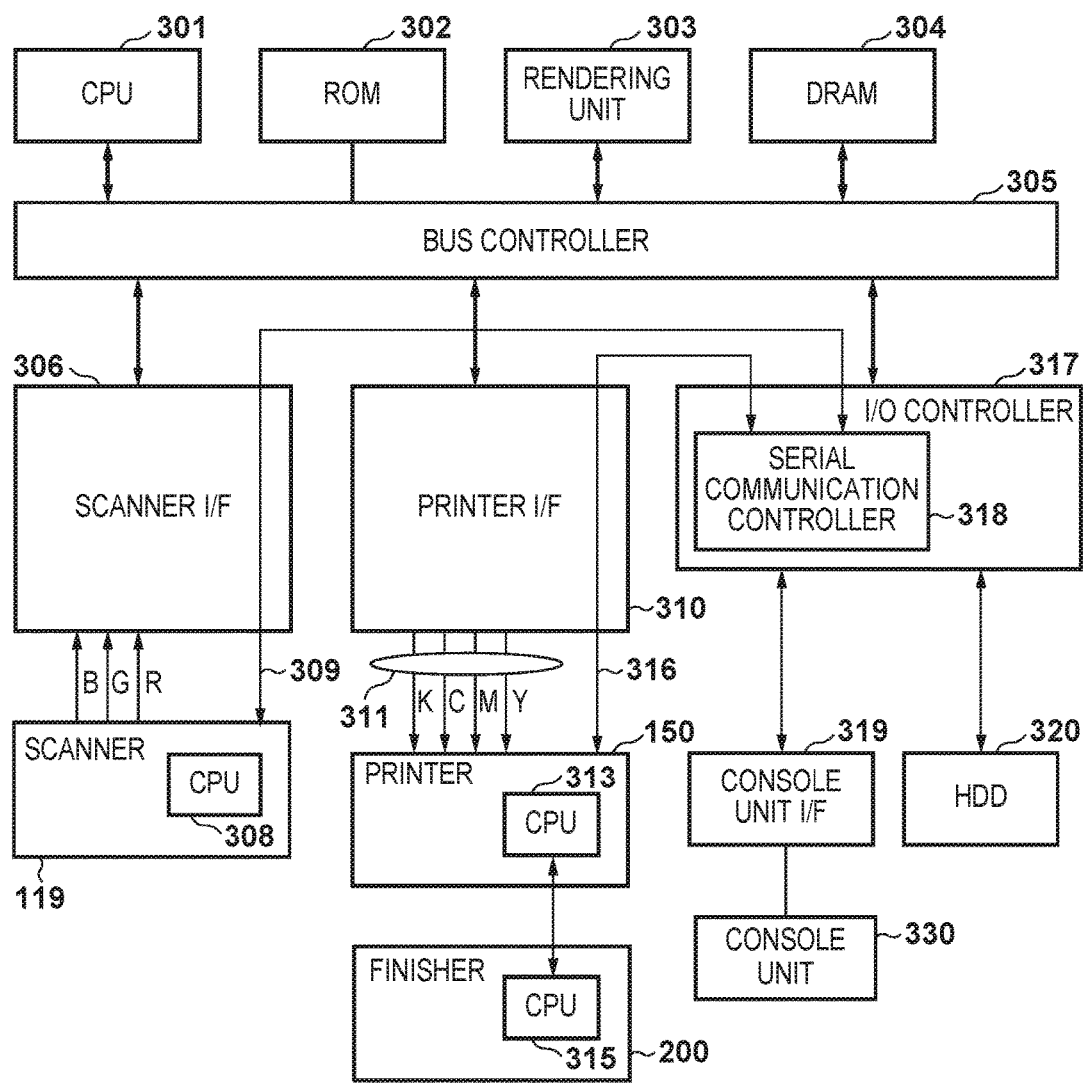
FIG. 3 is a block diagram for explaining a configuration of a control unit of the copying machine according to this embodiment.

FIG. 3 is a block diagram for explaining a configuration of a control unit of the copying machine according to this embodiment.

A CPU 301 executes later described control in accordance with a control program stored in a ROM 302, or a control program deployed, via an I/O controller 317, into a DRAM 304 from an HDD 320 by a boot program stored in the ROM 302.

Image data of an original read and obtained by the scanner 119 is converted into an RGB signal by control of a CPU 308 of the scanner 119, and is stored in the DRAM 304 via a bus controller 305 and a scanner I/F 306 under the control of the CPU 301. Thereafter, the image data is stored in the HDD 320 via the I/O controller 317. If printing the image data saved in the HDD 320, the image data is temporarily stored in the DRAM 304 under the control of the CPU 301. Thereafter, after color conversion processing such as an RGB→CMYK transformation is performed with a rendering unit 303, image data on which the color conversion processing has been performed is sent to the printer unit 150 via a printer I/F 310 and printed. At this point, the CPU 301 can instruct, via a serial communication controller 318 and a serial communication line 316 of the I/O controller 317, a CPU 313 of the printer unit 150 so to reverse the printed sheet and output it to the finisher 200.

In addition, the CPU 301 can instruct the CPU 308 of the scanner 119, via the serial communication controller 318 and a serial line 309 of the I/O controller 317, to read the original 103. With this the CPU 301 stores the image data obtained by the scanner 119 in the DRAM 304 or the HDD 320.

The CPU 301 loads the image data stored in the HDD 320 into the DRAM 304, and after converting from an RGB signal to a signal of a CMYK color space by the rendering unit 303, transfers the data to the printer unit 150 via a video cable 311 to execute printing.

A console unit interface 319 controls an interface with the console unit 330, outputs display data to the console unit 330, and transmits information input by a user with the console unit 330 to the CPU 301 via the I/O controller 317.

A CPU 315 is a CPU that the finisher 200 is equipped with, and controls operation of the finisher 200.

Figure 4A:
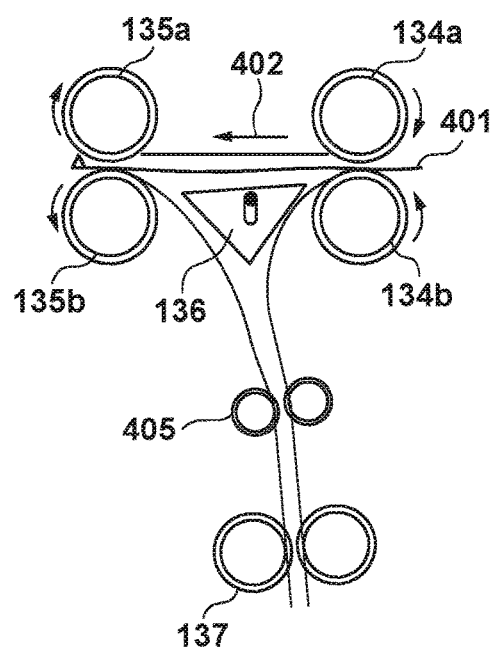
FIGS. 4A and 4B depict views for explaining a mechanism that discharges a printed sheet in the copying machine according to the embodiment.
Figure 4B:
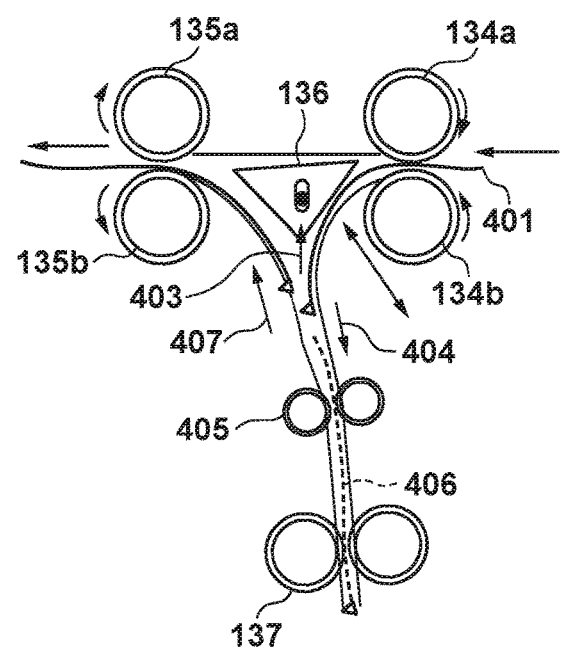

FIGS. 4A and 4B depict views for explaining a mechanism that discharges a printed sheet in the copying machine according to the first embodiment. In FIGS. 4A and 4B, portions in common with FIG. 1 are illustrated by the same reference numerals, but each roller of the conveyance roller pairs 134 and 135 of FIG. 1 are respectively illustrated by reference numerals 134a, 134b, 135a, and 135b.

For a sheet 401 to which an image has been fixed by the fixing unit 133, the image is formed on an upper surface of the sheet 401, and FIG. 4A illustrates a case in which the sheet is discharged to the finisher 200 unchanged. Here, by causing the conveyance rollers 134a, 134b, 135a, and 135b to respectively rotate in arrow directions, the sheet 401 is conveyed in a direction indicated by an arrow 402.

FIG. 4B depicts a view illustrating a case in which the front and back of the sheet 401 on which the image is fixed by the fixing unit 133 are caused to be reversed, and a surface on which the image of the sheet 401 is formed faces down and is discharged to the finisher 200. Here, by firstly causing the flapper 136 to move in a direction of an arrow 403 with respect to the sheet 401 sent from the fixing unit 133, the sheet 401 is lead in a direction of an arrow 404, and the sheet 401 is conveyed to a lower side by rotation of conveyance roller pairs 405 and 137. Thus, after temporarily stopping the conveyed sheet 401 at a position indicated by the reference numeral 406, by causing the conveyance roller pairs 405 and 137 to rotate in reverse, the sheet 401 is returned in a direction indicated by an arrow 407. At this point, the flapper 136 is positioned so as to send the returned sheet in a direction of the conveyance roller pair 135a, 135b. Thus, the front and back of the sheet 401 on which the image has been fixed by the fixing unit 133 are reversed, and the sheet is discharged to the finisher 200 by the rotation of the conveyance roller pair 135a, 135b.

The CPU 301 can instruct, via the serial communication controller 318 and the serial communication line 316 of the I/O controller 317, the CPU 313 of the printer unit 150 so to reverse or to not reverse the printed sheet and output it to the finisher 200.

Figure 5:
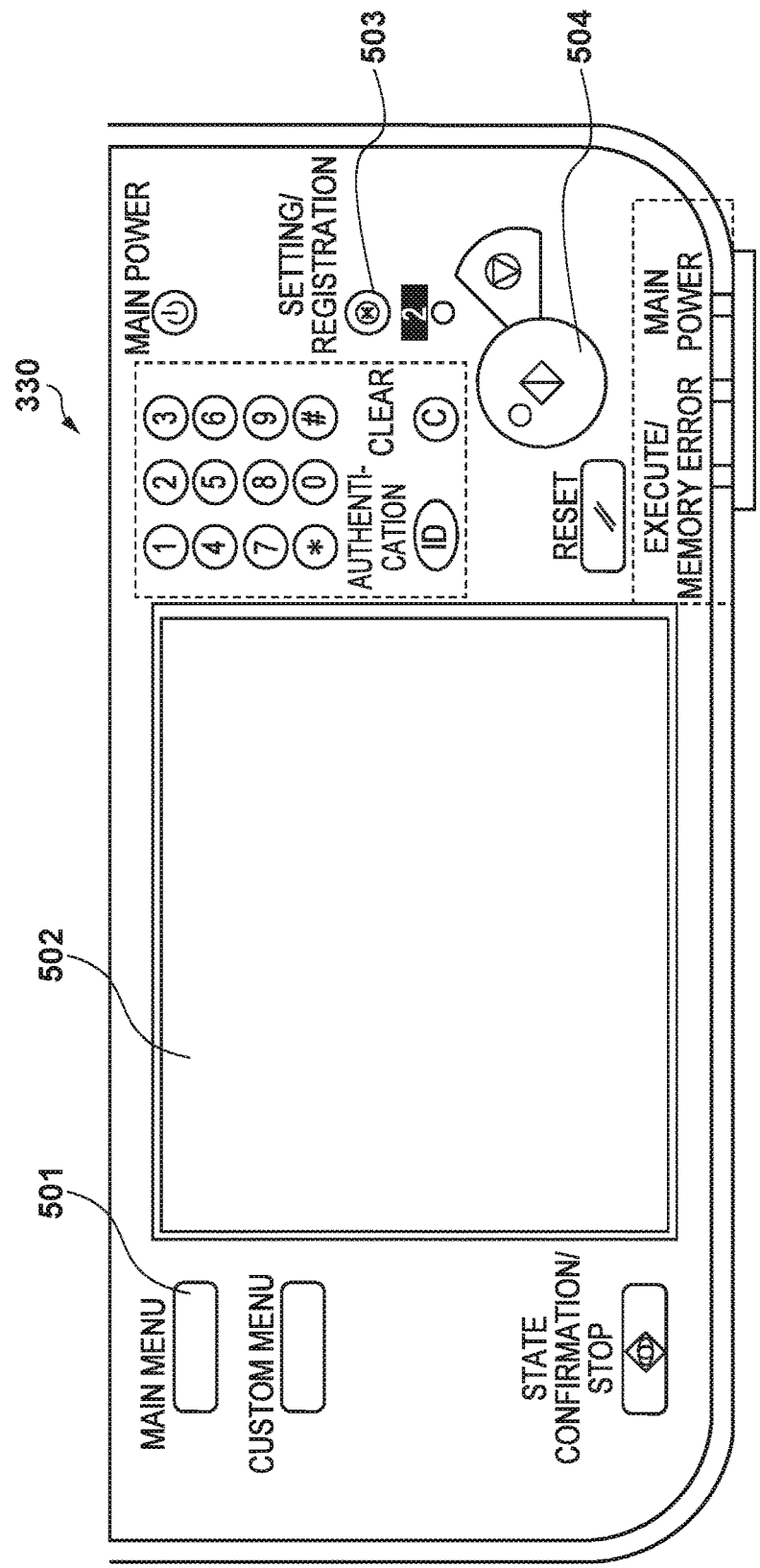
FIG. 5 depicts a perspective view of a console unit of the copying machine according to an embodiment.

FIG. 5 depicts a perspective view of the console unit 330 of the copying machine according to an embodiment.

A main menu key 501 is a key button that instructs so as to display a menu screen on a display unit 502. A user setting key 503 is a key button that instructs so as to display, for example a later described paper setting screen or the like on the display unit 502. A start key 504 is a key button that instructs a start or the like of a copy. Note that the display unit 502 is equipped with a touch panel function.

Next, before explaining the embodiment of the present invention in detail, with reference to FIGS. 8A-8H, a feature according to this embodiment is explained in detail.

FIGS. 8A-8H depict views for explaining an overview of the present embodiment.

Figure 8B:
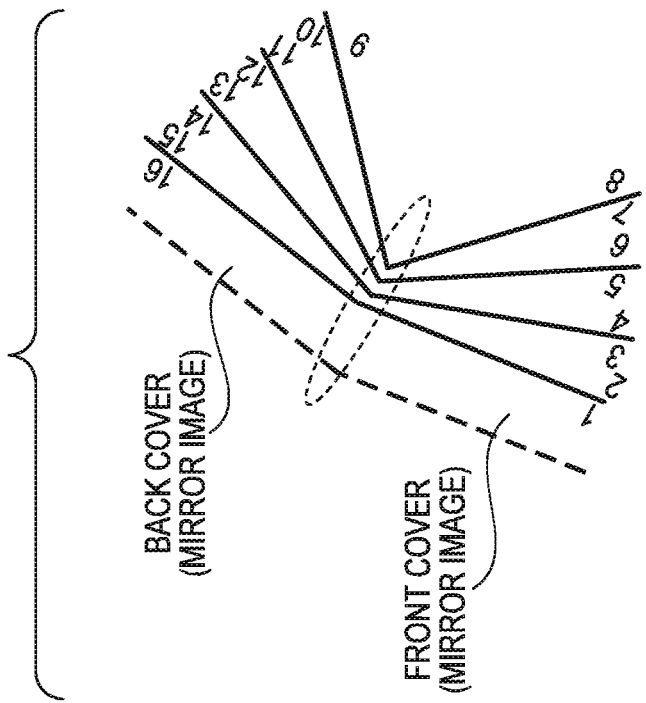
Figure 8A:
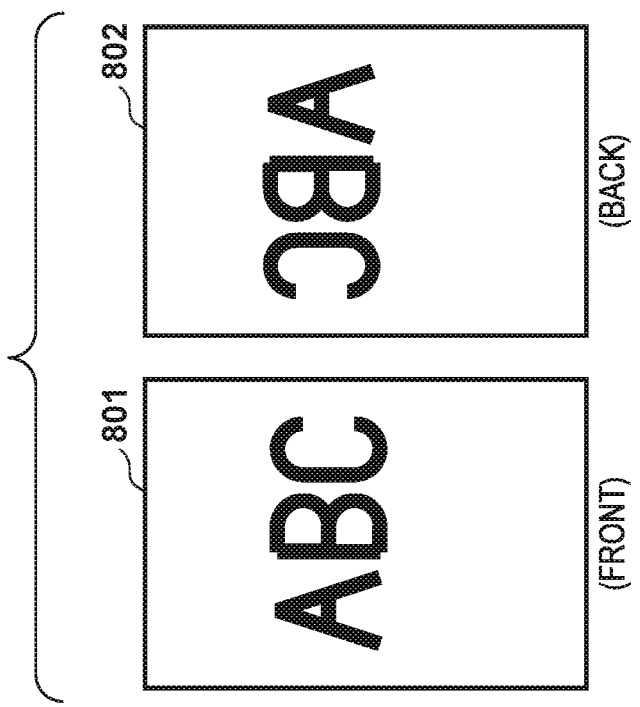

FIG. 8A illustrates a case in which a transparent film (particular sheet) is used for a front cover of the bookbinding, and a reference numeral 802 denotes a back surface of the transparent film, and illustrates a state in which an image of the front cover is printed on the back surface in a mirror image. A reference numeral 801 shows a view from a perspective of a front side of the transparent film. In this way, a method such as this is taken to cause print quality of the image of the front cover to improve because when the mirror image is printed on the transparent film, and that printed image is viewed from the back side, it appears as though a gloss of that image has increased.

FIG. 8B depicts a view illustrating a situation in which the body and the front cover are printed in the order illustrated in FIG. 8C, printed sheets are discharged to the finisher 200 without reversal and stacked on the stacking unit 203, and saddle-stitching is performed by the protrusion member 204. Here, for image data of the body, because each sheet is folded in two and saddle stitched, and each sheet is printed in a 2-in-1. The body is printed in an order from the end thereof toward the start, and printed sheets are stacked in sequence with its printed face upward. Lastly, image data of the front cover is printed in a mirror image on the back surface of the transparent film that is to be the front cover, and the front and back of the transparent film that has been printed to are reversed and the transparent film is discharged. With this, as illustrated in FIG. 8B, a state in which the transparent film of the front cover has been reversed and stacked on the body is entered, and in this state, upon the saddle-stitching by the protrusion member 204, a bookbinding product having a front cover with a gloss is obtained.

FIG. 8D illustrates a case in which, because a sheet has strong resilience in the case of a transparent film, in a copying machine, an image of a front cover cannot be printed to the back surface thereof (double-sided printing is impossible). Accordingly, in such a case, it becomes impossible to print in an order such as is illustrated in FIG. 8C.

FIG. 8E and FIG. 8F depict views for explaining a print order of print data for bookbinding according to this embodiment, and a stacking order to the finisher 200 for printed sheets.

In FIG. 8E, firstly an image of the front cover is printed in a mirror image to the front surface of a transparent film that is to be the front cover, and that transparent film is discharged to the finisher 200 without reversal. Next, sheets that are to be the body are, as illustrated in FIG. 8E, printed in an order from the start of the body toward the end thereof, and the front and back of each sheet on which the body has been printed are reversed, and the sheets are discharged to the finisher 200. Thus, a state in which these sheets are stacked in the finisher 200 is illustrated in FIG. 8F.

Here, as illustrated in FIG. 8B, for these sheets to be stacked by the stacking unit 203 and saddle-stitched by the protrusion member 204, a stacking order as illustrated in FIG. 8G is necessary. In other words, it is understood that it is sufficient that the transparent film be positioned at a top position, and that sheets of the body be stacked after that in an printed order of the sheets.

FIG. 8H illustrates a case in which, for this reason, the order of printing made to be the reverse of the case of FIG. 8E, and sheets on which the body is printed are discharged without reversal, and finally a transparent film on which the image of the front cover is printed is discharged to the finisher 200 without reversal. With this, the sheets are stacked in the stacking unit 203 by a stacking order as illustrated in FIG. 8G. This corresponds to processing illustrated in the flowchart of FIG. 7.

Figure 6A:
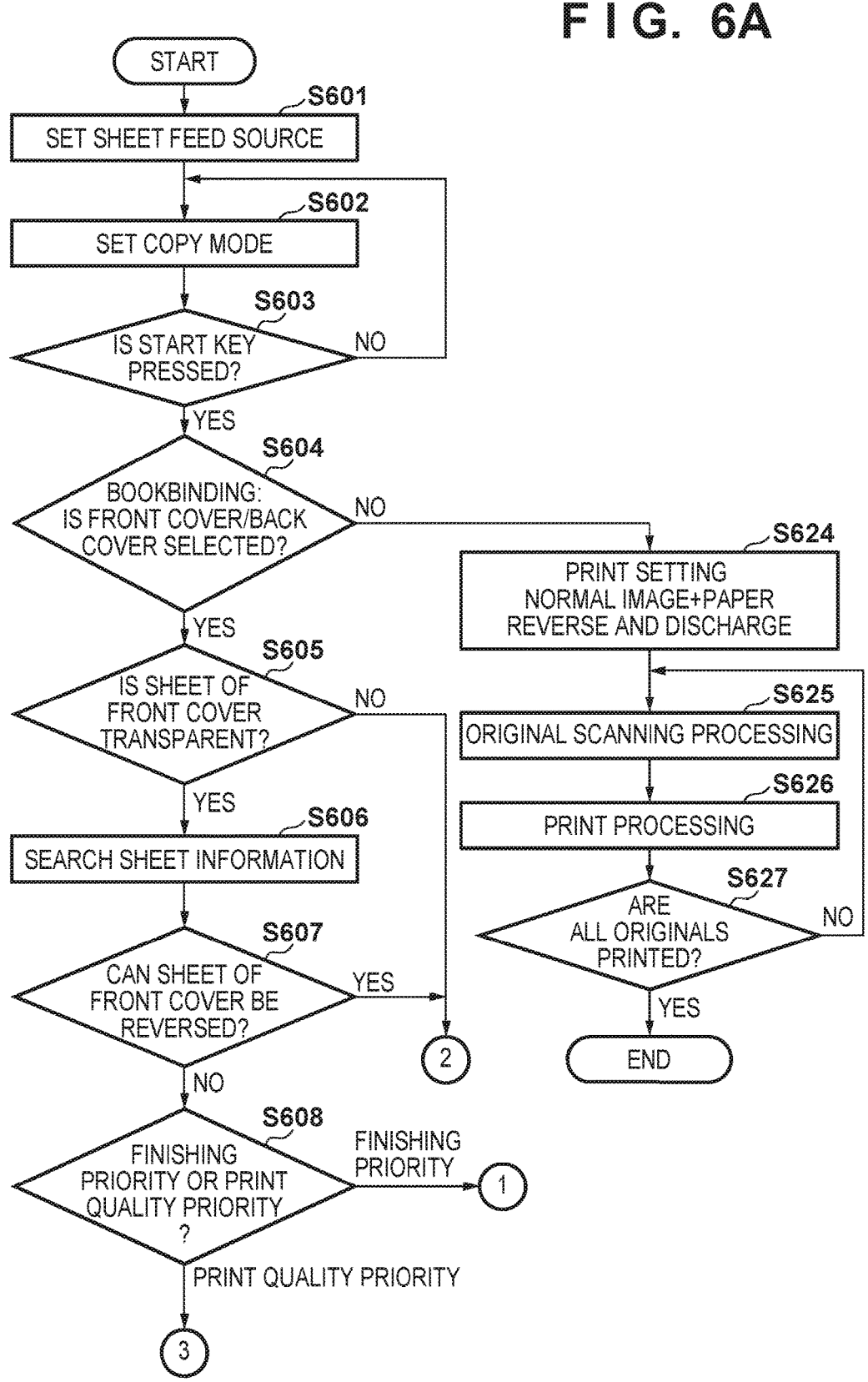
FIGS. 6A, 6B and 7 are flowcharts for describing printing and discharge processing by the copying machine according to the embodiment.
Figure 6B:
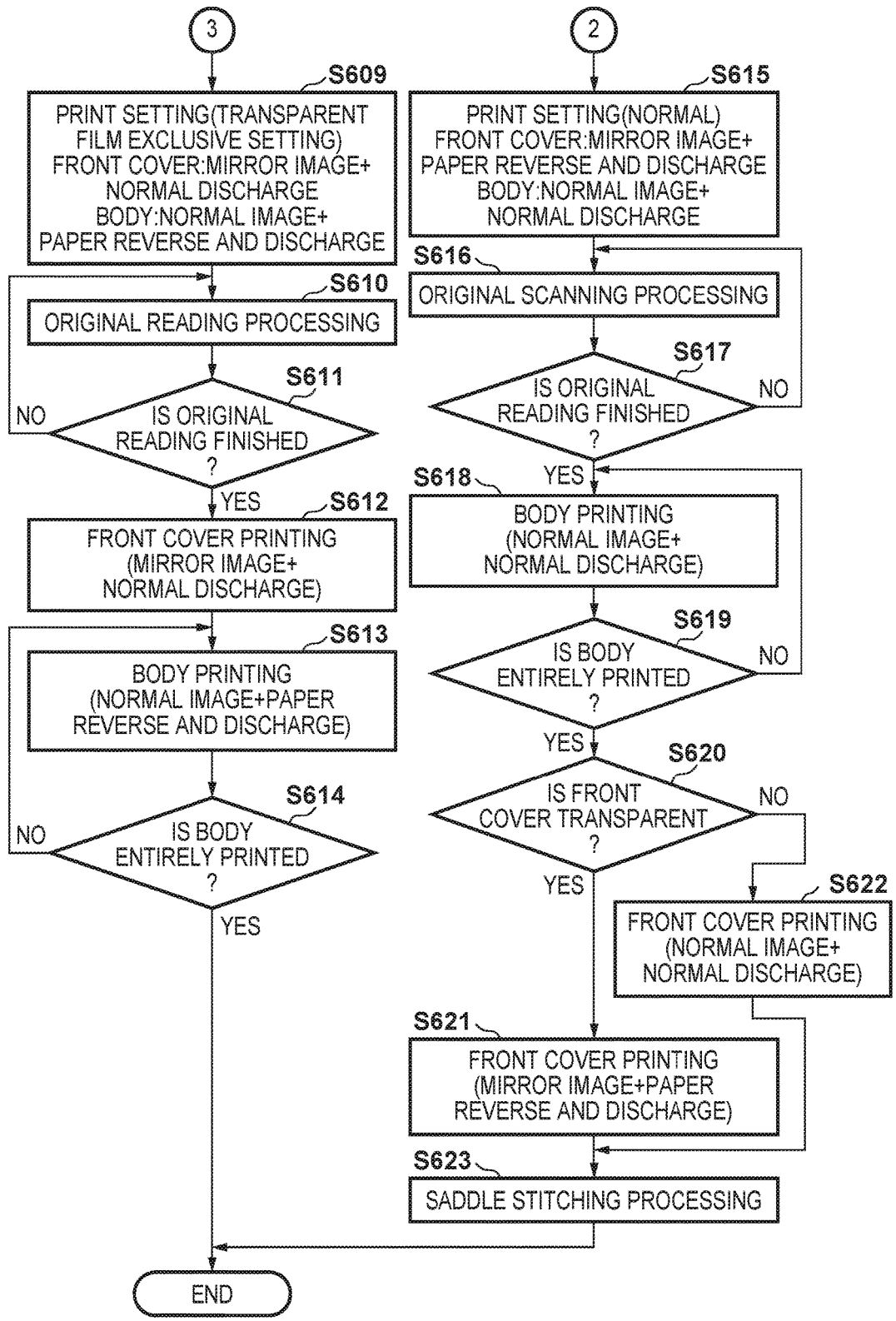
Figure 7:
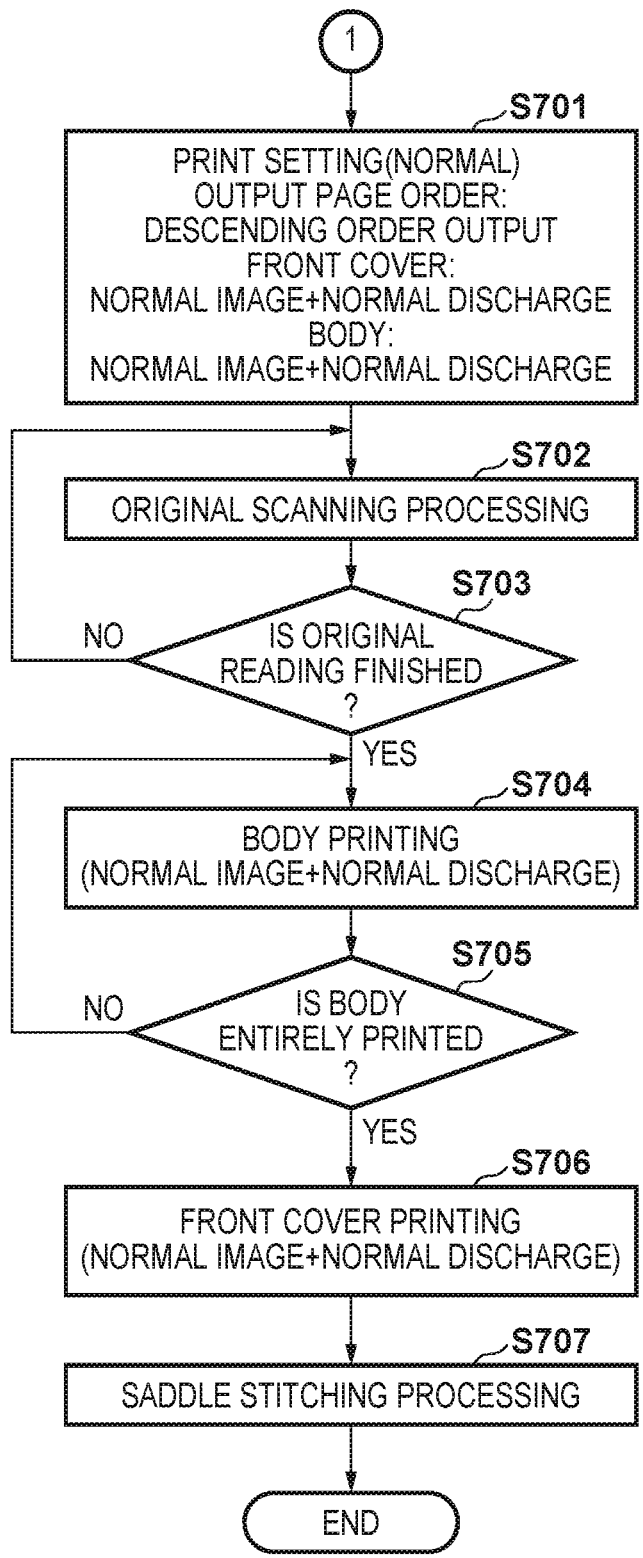

FIGS. 6A, 6B and 7 are flowcharts for describing printing and discharge processing by the copying machine according to the embodiment. Note that the control program that executes this processing is stored in the ROM 302 or the HDD 320, is deployed to the DRAM 304 at a time of execution, and is executed under the control of the CPU 301 to achieve processing illustrated in this flowchart.

Firstly in step S601 the CPU 301 sets a sheet feed source used in printing. At this point a user, as preparation for performing printing, after setting sheets in the feed cassette 131 or the feed cassette 132, registers a type of the sheets to the feed cassette. At this point, the user operates the user setting key 503 of the console unit 330 to cause a paper setting screen to be displayed on the display unit 502 and to register the type of the sheets set in the feed cassette.

Figure 10A:
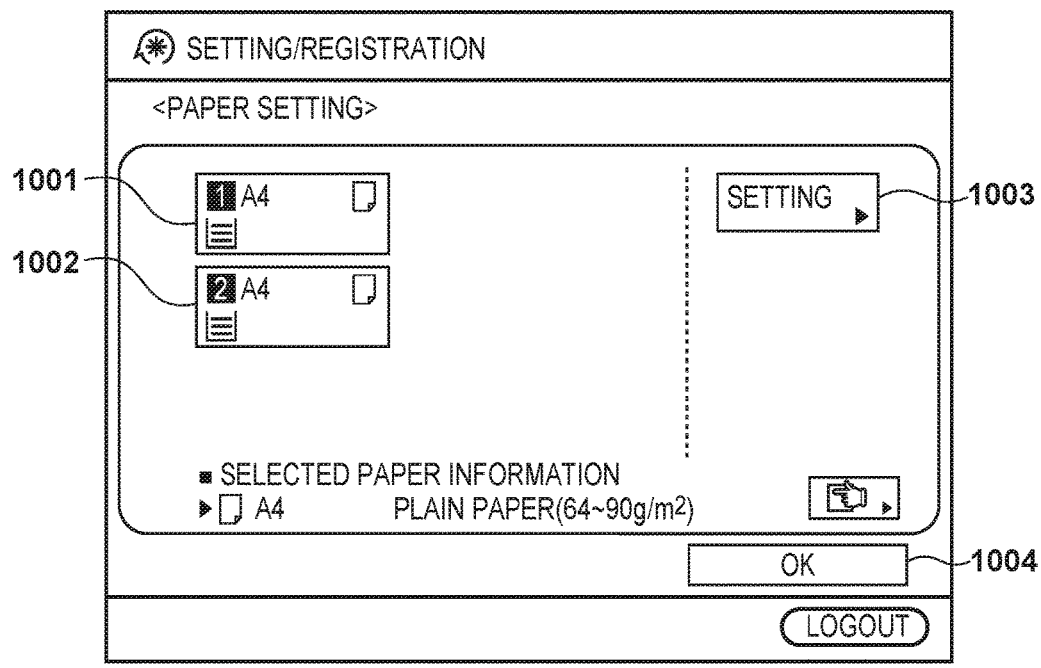
FIGS. 10A and 10B depict views illustrating examples of a paper setting screen displayed on the console unit of the copying machine according to the embodiment.
Figure 10B:
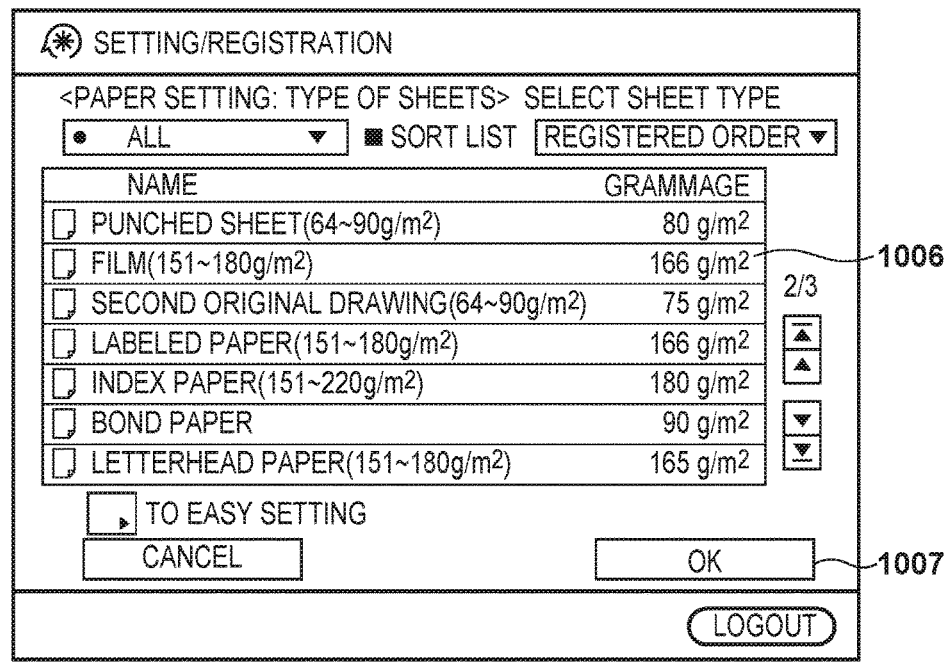

FIGS. 10A and 10B depict views illustrating examples of paper setting screens displayed on the console unit 330 of the copying machine according to the embodiment.

FIG. 10A illustrates an example of the paper setting screen, and here a button 1001 is a button that instructs a sheet setting of the feed cassette 131, and a button 1002 is a button that instructs a sheet setting of the feed cassette 132. Here, for example, upon the button 1001 being pressed and a setting button 1003 being pressed, for example a screen for setting a sheet type as illustrated by FIG. 10B is displayed.

In FIG. 10B, upon selecting a sheet type that a user has set from a sheet type list 1006, an OK button 1007 becomes pressable. In FIG. 10B, when the user selects a sheet type from the sheet type list 1006 and presses the OK button 1007, the screen of FIG. 10A is returned to. When the user presses an OK button 1004 on the screen of FIG. 10A, the processing for setting the sheets to the feed cassette that the user has selected terminates.

Thus the CPU 301 can obtain the sheet type that a user set in the feed cassette 131 or the feed cassette 132.

FIG. 9A depicts a view illustrating an example of a sheet information table that stores sheet information thus set in the feed cassettes 131 and 132 and the manual feed tray 138. This information is for example stored in the HDD 320. Note that, in FIG. 9A, "1" of a sheet feed source corresponds to the feed cassette 131, and "2" of the sheet feed source corresponds to the feed cassette 132.

In addition, FIG. 9B illustrates a sheet type list table displayed in the sheet type list 1006 of FIG. 10B, and this information is for example saved in the ROM 302 or the HDD 320. A paper type ID of FIG. 9A corresponds to the paper type ID of the sheet type list of FIG. 9B. In the example of FIGS. 9A and 9B, A4 size plain paper is set in the feed cassette 131, a transparent film is set in the feed cassette 132, and punched sheets are set in the manual feed tray 138 respectively. In this way, in step S601 the CPU 301, for example, creates the sheet information table as shown in FIG. 9A, and saves it in the DRAM 304 or the HDD 320.

Next, the processing proceeds to step S602, and the CPU 301, when the main menu key 501 of the console unit 330 is pressed, displays a copy screen on the display unit 502, and sets a copy mode in accordance with information input by a user via this copy screen.

FIGS. 11A and 11B and FIGS. 12A and 12B depict views for explaining examples of copy screens according to an embodiment.

Figure 11A:
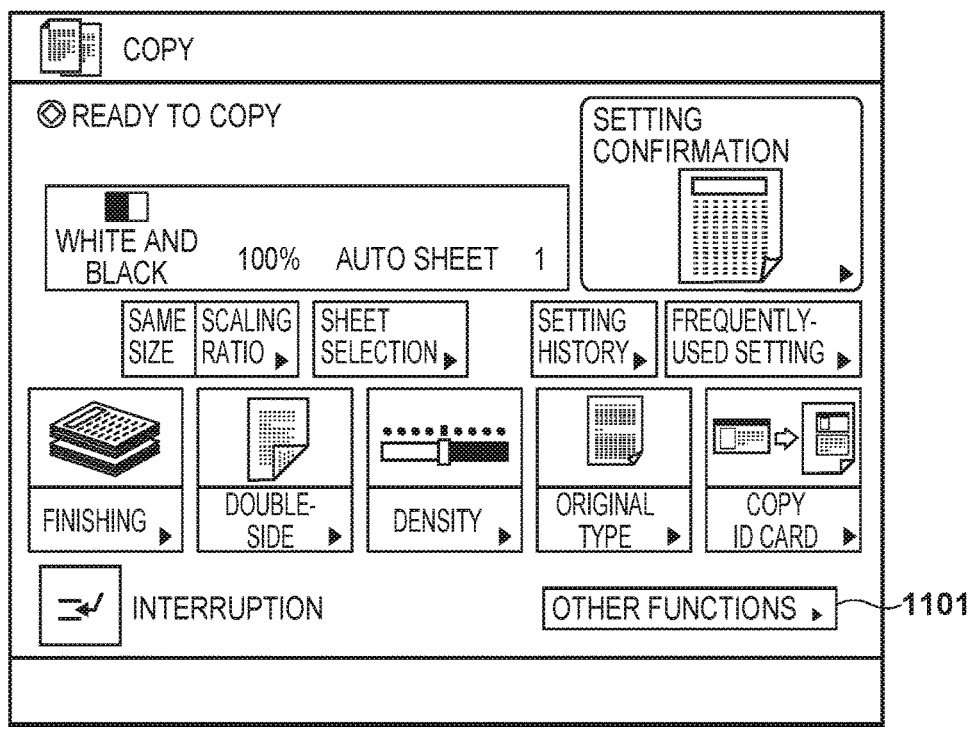
FIGS. 11A and 11B and FIGS. 12A and 12B depict views for explaining examples of copy screens according to an embodiment.

FIG. 11A illustrates an example of an initial screen for copying. Here, when an "other functions" button 1101 is pressed, a screen for setting other functions of FIG. 11B is displayed.

Figure 11B:
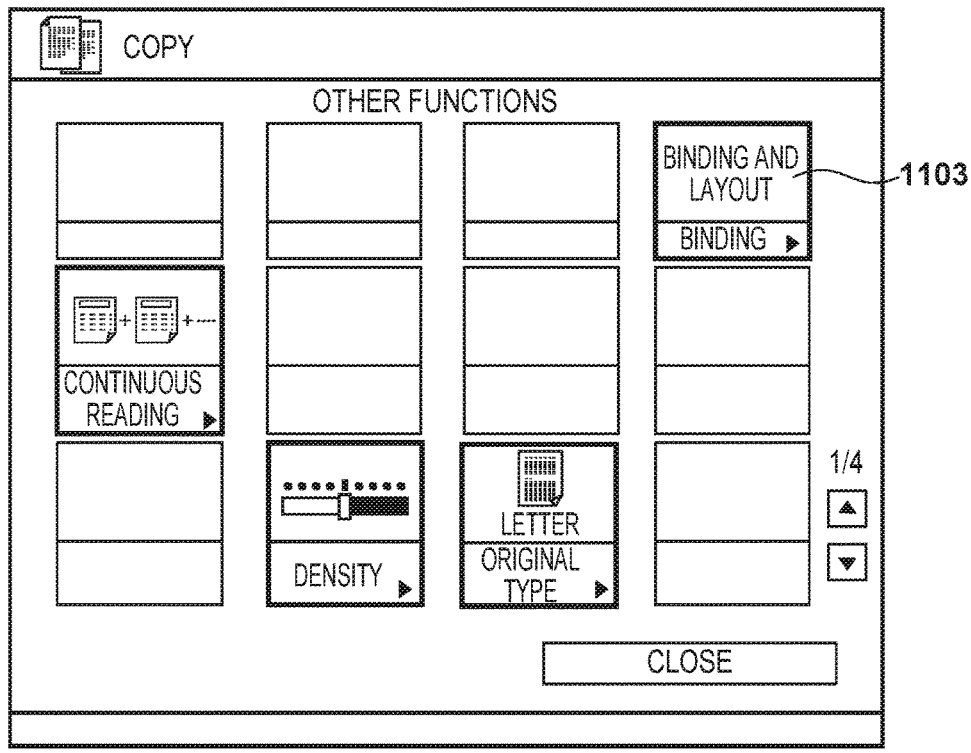
Figure 12A:
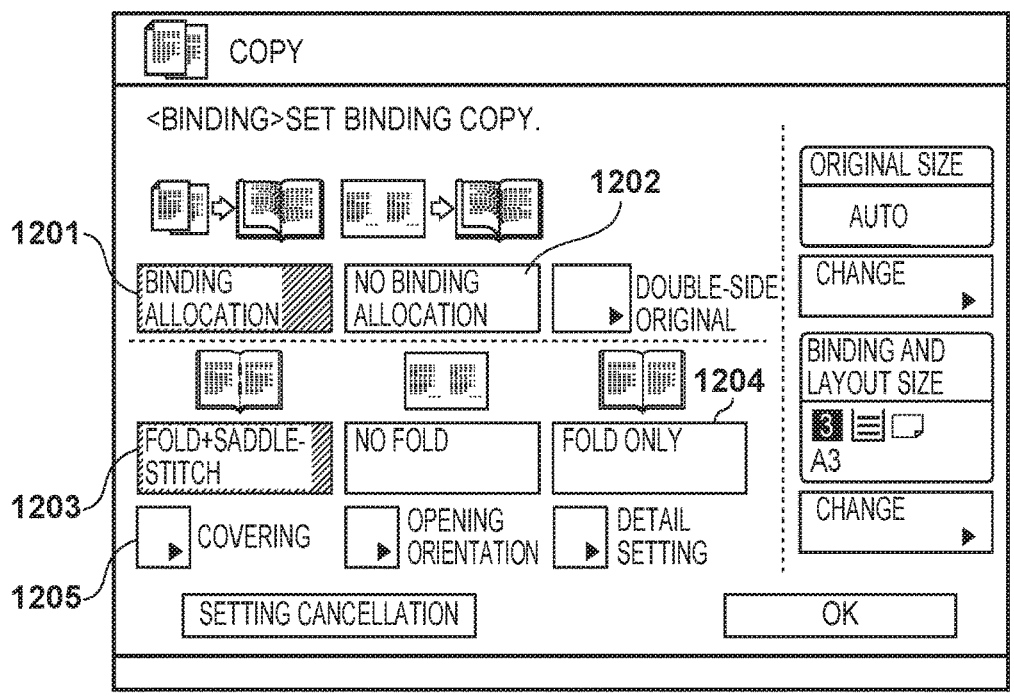

When a "binding and layout" button 1103 in FIG. 11B is pressed, a screen for setting copy for binding as illustrated in FIG. 12A is transitioned to.

The screen for setting copy for binding of FIG. 12A includes a "binding allocation" button 1201, a "no binding allocation" button 1202, a "fold+saddle-stitch" button 1203, a "fold only" button 1204, and a "covering" button 1205.

Figure 12B:
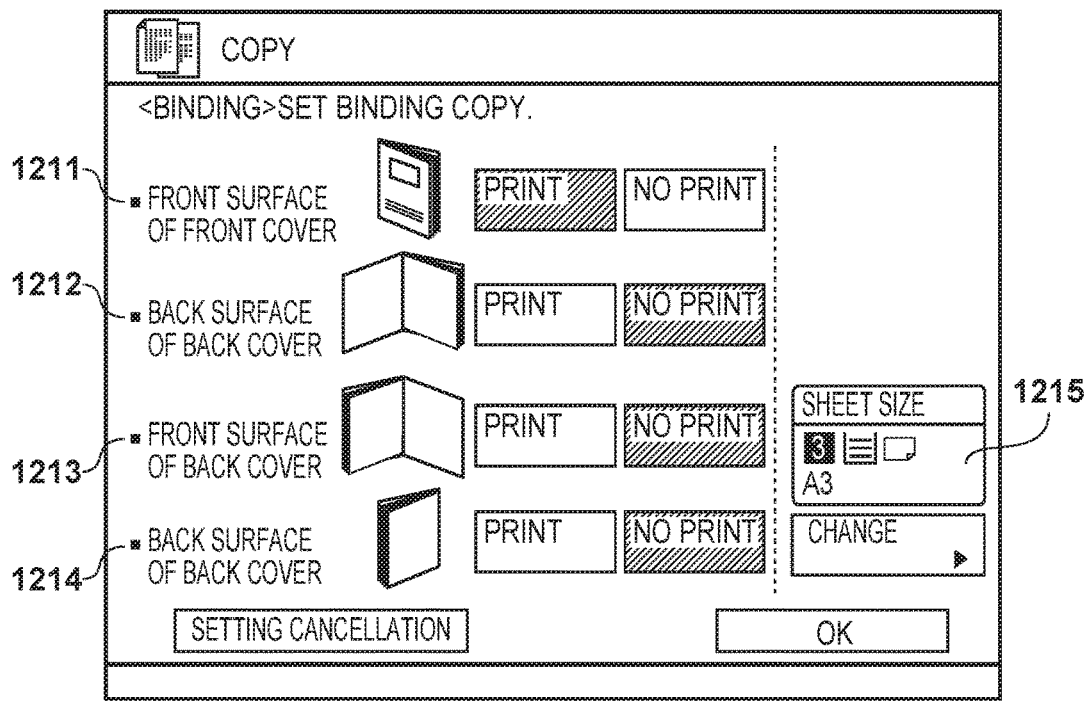

Here, when the "covering" button 1205 is pressed, a screen for setting a front cover as illustrated in FIG. 12B is displayed. This screen for setting includes a "front surface of front cover" button 1211 that sets printing of the front cover, a "back surface of front cover" button 1212, a "front surface of back cover" button 1213, a "back surface of back cover" button 1214, and a selection 1215 of a sheet used for the front cover.

Content set by a user via these screens for setting is notified from the console unit I/F 319 to the CPU 301 via the I/O controller 317. In step S602, the CPU 301 saves this notified content in the DRAM 304 as a copy mode setting.

Next, the processing proceeds to step S603 and the CPU 301 waits for a user to place originals that the user desires to copy on the original tray 102, and press the start key 504. When the start key 504 is pressed the processing proceeds to step S604, and the CPU 301 starts a copy operation in accordance with the copy mode setting saved in the DRAM 304.

At this point, in step S604 the CPU 301 determines, from the copy mode setting saved in the DRAM 304, whether or not a front cover of bookbinding processing has been set. If it is determined that the front cover of bookbinding processing is not set, the processing proceeds to step S624, and the CPU 301 instructs paper reverse and discharge to the CPU 313 of the printer unit 150.

With this the CPU 313 of the printer unit 150 performs controls as explained by the previously described FIG. 4B upon discharge of the printed sheets, and controls so as to reverse the front and back of already printed sheets, and discharge to the finisher 200. With this the already printed sheets are stacked on the output tray 211 of the finisher 200 in a state in which the print face is downward.

Next, the processing proceeds to step S625 and the CPU 301 instructs, via the I/O controller 317, the serial communication controller 318, the serial line 309, to the CPU 308 of the scanner 119 to read an original. With this, image data of the original obtained by the scanner 119 is obtained and stored in the DRAM 304 and the HDD 320. Next, the processing proceeds to step S626, and the CPU 301 causes the image data stored in the HDD 320 to be processed by the rendering unit 303, and, via the printer I/F 310, to be output to the printer unit 150 and printed. With this the CPU 313 of the printer unit 150, via the printer I/F 310, prints the received image data on a sheet, performs control of sheet reversal and discharge designated in advance from the CPU 301, and discharges to the finisher 200. The processing proceeds to step S627 and the CPU 301 repeats and executes processing of step S625-step S627 until all originals are read and printed, and when processing for all originals terminates, this processing terminates.

Meanwhile, in step S604 if the CPU 301 determines that the front cover of the bookbinding processing is set in the copy mode setting saved in the DRAM 304, the processing proceeds to step S605, and the CPU 301 determines whether or not a sheet selected as the front cover is a transparent film. At this point the CPU 301 obtains, from the copy mode setting set in the DRAM 304, the paper type ID (FIG. 9A) set for the feed cassette (paper supplier) that contains a sheet used for the front cover. From this the paper type ID, for example, the sheet type list table of FIG. 9B is referred to, and a name, a surface property, a color, or the like of the sheet used as the front cover are obtained. Thus the CPU 301, based on attribute information such as the obtained surface property or color of the paper type ID, determines whether or not the sheet selected as the front cover is a transparent film.

In step S605, if the CPU 301 determines that the sheet selected as the front cover is not transparent, the processing proceeds to step S615 (FIG. 6B). In step S615, the CPU 301, via the printer I/F 310, instructs the CPU 313 of the printer unit 150 for control of both reversal and discharge of the already printed sheet, and normal discharge that discharges without reversal, as well as saddle stitching processing.

The processing proceeds to step S616 and the CPU 301 reads the original 103 by flow reading, and stores image data thereof to the HDD 320. In step S617, when the originals 103 are all read and saved as image data to the HDD 320, the processing proceeds to step S618. In step S618, the CPU 301 loads into the DRAM 304 in an order from image data last stored in the HDD 320, outputs, via the printer I/F 310, image data processed by the rendering unit 303 to the printer unit 150 to cause it to print. At this point, the CPU 301 instructs the CPU 313 to perform control corresponding to normal discharge (FIG. 4A) that discharges without reversal. This processing is repeatedly executed until in step S619 the body has been entirely printed. With this, printed sheets of the body are stacked in the stacking unit 203 of the finisher 200 in a state of an order from the final printed sheet of the body with a print face upward (for example, as with the body of FIG. 8B).

In this way, printing of the body completes, it is stacked in the stacking unit 203 of the finisher 200, and the processing proceeds to step S620. In step S620 the CPU 301 determines final image data of the image data transferred to the printer unit 150 from the HDD 320 as image data for the front cover. From the copy mode setting saved in the DRAM 304, the CPU 301 specifies a feed cassette that contains a sheet for the front cover, and obtains the paper type of the feed cassette, and determines whether or not the sheet to use for the front cover is transparent. If it is determined that the front cover is transparent, the processing proceeds to step S621, and the CPU 301 instructs paper reverse and discharge processing to the CPU 313 of the printer unit 150. The image data that is to be the front cover and is stored in the HDD 320 is loaded into the DRAM 304 from the HDD 320, subject to RGB→YMCK color space processing by the rendering unit 303, and after being mirror image processed, is caused to be printed by outputting to the printer unit 150. Thereby, the CPU 313 of the printer unit 150, in accordance with an instruction by the CPU 301, determines the printed sheet as explained, and discharges as previously described FIG. 4B. With this, the transparent film that is to be the front cover enters a state (refer to FIG. 8B) in which it is stacked with its print face downward on the sheet bundle (body) of the stacking unit 203 of the finisher 200.

After the front cover is thus discharged and stacked in the stacking unit 203, the CPU 313 of the printer unit 150 instructs saddle stitching processing to the CPU 315 of the finisher 200. With this, the CPU 315 of the finisher 200 uses the protrusion member 204 on the sheet bundle 212 stacked on the stacking unit 203, after it is conveyed from the conveyance port 201, to perform saddle stitching processing (step S623). A resulting document thus saddle stitch bound is discharged to the tray 206 by the discharge roller 205.

At this point, the sheets of the body are printed in an order from the final page, and are stacked on the stacking unit 203 in a state in which a print face thereof is upward. Accordingly, an uppermost page of the sheet bundle of the stacked body becomes the first page, and thereon the transparent cover is stacked in a state in which a mirror image is printed to its front surface and it is reversed. In this state, as illustrated in FIG. 8B, upon using the protrusion member 204 to execute saddle stitching, a bookbinding product comprised by the front cover of the transparent film and the body is obtained. At this point, the front cover enters a state in which, from back side of the transparent film, an image of the mirror image of the front cover printed on the front side can be seen, and as a result, the front cover for example can be seen as FIG. 8A.

In contrast, in step S620 if the CPU 301 determines that the sheet of the front cover is not transparent, the processing proceeds to step S622 and the CPU 301 instructs normal discharge processing to the CPU 313 of the printer unit 150. Then the image data of the front cover stored in the HDD 320 is loaded into the DRAM 304 from the HDD 320, subject to RGB→YMCK color space processing by the rendering unit 303, and caused to be printed by outputting to the printer unit 150. Thereby, the CPU 313 of the printer unit 150, in accordance with an instruction by the CPU 301, prints the front cover, and discharges the printed sheet by a normal discharge as explained in FIG. 4A. The processing proceeds to step S623, and the CPU 313 causes the CPU 315 of the finisher 200 to perform similar saddle stitching processing to that previously described.

At this point, the sheets of the body are stacked on the stacking unit 203 in a state in which a print face thereof is upward in an order from the end. Accordingly, the top the sheet bundle of the stacked body becomes the sheet of the first page, and thereon a cover is stacked in a state in which a normal image is printed thereon. In this state, when the protrusion member 204 is used to perform saddle stitching processing, a bookbinding product comprising the front cover and the body is obtained. In such a case, for FIG. 8B, only that the image of the front cover is printed in a normal image to the front surface of the front cover is different, and otherwise it is the same.

Meanwhile, in step S605 if the CPU 301 determines that the sheet of the front cover is transparent, the processing proceeds to step S606 and the CPU 301 obtains the size of the sheet of the front cover from the standard-size of the sheet information table of FIG. 9A, and obtains the surface property of the sheet from the surface property of the sheet type list table of FIG. 9B. From the obtained sheet characteristics, a prohibition information table of FIG. 9C is referred to, and whether or not paper reverse and discharge for the sheet to use as the front cover is possible is determined.

FIG. 9C depicts a view illustrating an example of the prohibition information table for sheets according to the embodiment.

Here, the sheet information corresponds to a surface property of the sheet type list table of FIG. 9B. In FIG. 9C, it is set so that double-sided coated paper and film cannot be stored in the feed cassette 131, and double-sided printing and paper reverse and discharge also cannot be performed.

From the table of FIG. 9C, if the CPU 301 determines that the sheet to be used as the front cover cannot be reversed, the processing proceeds to step S608, and if it determines that reversal is possible the processing proceeds to step S615, and the previously described processing is executed. Note that, determination in step S620 that the sheet of the front cover is transparent is due to the fact that there are cases in which the processing proceeds to step S615 from this step S607.

In step S608 the CPU 301, based on the user mode setting saved in the DRAM 304, determines whether a finishing priority or a print quality priority is set.

This user mode setting can be set by a user pressing the user setting key 503 of the console unit 330.

Figure 13:
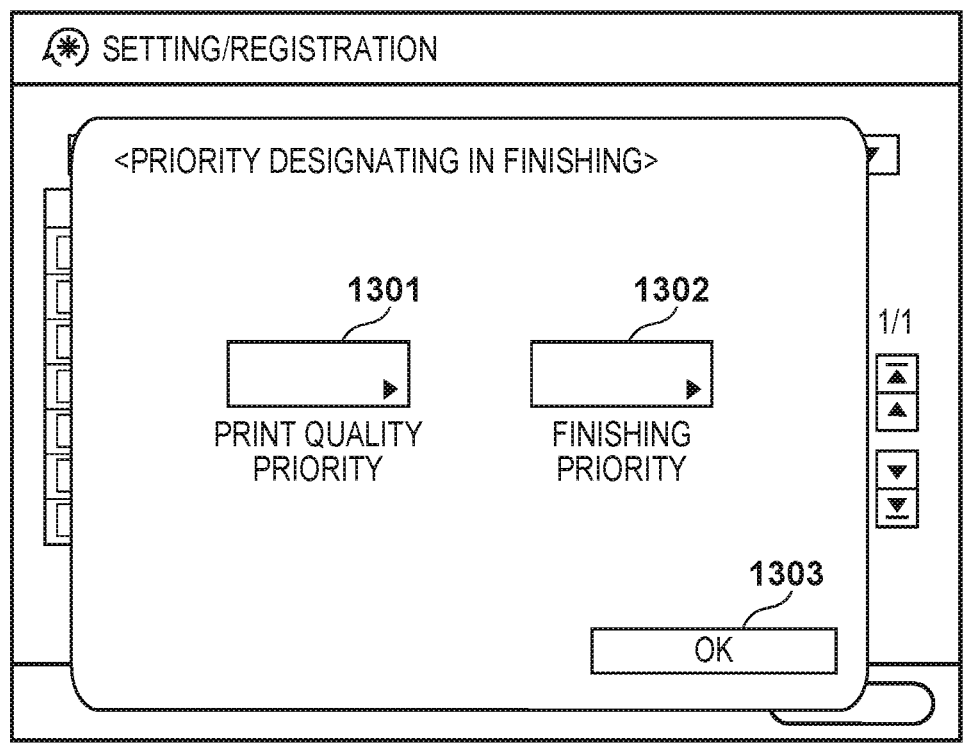
FIG. 13 depicts a view illustrating an example of a finishing priority designating screen displayed on the console unit when a user setting key is pressed.

FIG. 13 depicts a view illustrating an example of a finishing priority designating screen displayed on the console unit 330 when the user setting key 503 is pressed.

By a user pressing either a print quality priority button 1301 or a finishing priority button 1302 and then pressing an OK button 1303 in this screen, a priority mode selected in the screen is saved to the DRAM 304. Here, the print quality priority is such that, if a transparent film is used for the front cover, by printing a mirror image to the film and viewing the printed image from the side opposite to the print face of the film, it is possible to treat it as a cover image having gloss. In contrast, the finishing priority is something that enables saddle stitching using the protrusion member 204 where stacking to the stacking unit 203 in a bookbinding order of a sheet on which a front surface is printed, and a sheet on which a body is printed is performed.

In step S608, if the CPU 301 determines that the print quality priority has been set, the processing proceeds to step S609 (FIG. 6B), and if the finishing priority is determined to have been set, the processing proceeds to step S701 (FIG. 7).

In step S609 the CPU 301 instructs both normal discharge and paper reverse and discharge to the CPU 313 of the printer unit 150, and in step S610 processing for reading the original 103 similar to that of the previously described step S616 is performed. In step S611, when the reading of the original completes, image data initially read from the image data saved in the HDD 320 is set as image data of the front cover. The processing proceeds to step S612 and the CPU 301 instructs normal discharge to the CPU 313 of the printer unit 150. From the HDD 320, the initial image data that is to become the front cover is loaded into the DRAM 304, RGB→CMYK color space conversion by the rendering unit 303 and mirror image processing are performed, and the front cover is printed by the printer unit 150. With this the CPU 313 of the printer unit 150 prints the mirror image of the image data of the front cover that has been transferred to the front surface of the front cover, and, by normal discharge control, discharges to the finisher 200. At this point, because saddle stitching processing has not been instructed, the CPU 315 of the finisher 200 discharges the sheet that has been conveyed to the output tray 211.

Thus, when printing of the image data of the front cover has completed, the processing proceeds to step S613, and to print remaining image data stored in the HDD 320 as the image data of the body, the CPU 301 instructs paper reverse and discharge processing to the CPU 313 of the printer unit 150. After transferring the image data from the HDD 320 to the DRAM 304, the RGB→CMYK color space conversion processing by the rendering unit 303 is performed, and the image data is transferred to the printer unit 150. Thus the CPU 313 prints the transferred image data to sheets, performs paper reverse and discharge processing and discharges to the finisher 200. With this, the CPU 315 of the finisher 200 discharges the sheets that have been conveyed to the output tray 211 as previously explained. The CPU 301 terminates this processing when printing of the image data of the entire body, excluding the image data determined to be the front cover saved in the HDD 320 in step S613 through step S614, is executed.

At this point, sheets stacked on the output tray 211 of the finisher 200 are for example as in FIG. 8F. In other words, firstly at the start, the transparent front cover on which the mirror image has been printed is stacked on the output tray 211 its print face upward. Next, the sheets on which the body has been printed are stacked, in an order from the first page of the body, on the output tray 211 in state in which the print face thereof is downward. Accordingly, when the sheet bundle discharged to the output tray 211 is retrieved, and the sheet bundle is inverted so that the front cover of the bottommost face of the sheet bundle comes upward, as illustrated in FIG. 8B, it becomes a bundle of printed material stacked with the transparent cover on the top, and the body stacked thereunder in an order from the head page. Thus, a bundle of printed material for which the front cover is a front cover of a glossy image is obtained.

Meanwhile, in step S608 if the CPU 301 determines the finishing priority, the processing proceeds to step S701 (FIG. 7), and the CPU 301 instructs normal discharge control and saddle stitching processing to the CPU 313 of the printer unit 150. Next, the processing proceeds to step S702 and the CPU 301, similarly to the previously described step S616 or the like, performs original read processing by the scanner 119, and saves image data of the originals to the HDD 320. Thus, when reading of all originals is complete, processing proceeds from step S703 to step S704, and the CPU 301 transfers the image data saved in the HDD 320 in an order from the end thereof to the CPU 313 of the printer unit 150. With this the CPU 313 of the printer unit 150 prints the image data that is transferred, and performs normal discharge control to discharge to the finisher 200.

At this point, the CPU 313 of the printer unit 150 designates saddle stitching processing to the CPU 315 of the finisher 200. With this, sheets conveyed to the finisher 200 are stored by the stacking unit 203. Thus, in step S705 when printing of the body completes, the processing proceeds to step S706, and the CPU 301 determines the image data saved in the HDD 320 that was first read to be the image data of the front cover, and loads that image data into the DRAM

304. RGB→YMCK color space processing is then performed by the rendering unit 303, and by transferring to the printer unit 150, and the front cover is caused to be printed. With this the CPU 313 of the printer unit 150 prints the image data that is to be the front cover, and performs normal discharge control of the printed sheet to discharge to the finisher 200.

Thus, when the sheet on which the front cover has been printed is discharged, the processing proceeds to step S707, and saddle stitching processing is notified to the CPU 315 of the finisher 200. With this the CPU 315 of the finisher 200 uses the protrusion member 204 on the sheet bundle 212 in which the discharged sheets stacked on the stacking unit 203 to perform saddle stitching processing. When the saddle stitch bound bookbinding product is discharged to the tray 206 by the discharge roller 205, this processing terminates. A print order in this case is illustrated in FIG. 8H, and a stacking state of the stacking unit 203 is illustrated in FIG. 8G.

At this point, sheets on which the body has been printed are stacked on the stacking unit 203 in a state in which print faces thereof are upward such that the head page thereof comes to the top. Furthermore, thereon the sheet on which the image of the front cover has been printed is stacked in a state in its print face is upward. Accordingly, when, in this state, the protrusion member 204 is used to perform saddle stitching processing, a bookbinding product comprising the front cover and the body is obtained. In such a case, the image of the front cover is seen from the printed front surface and not from the back surface. Accordingly, although the image of the front cover does not become glossy, because it is possible to execute saddle stitching processing as is, it is possible to efficiently execute bookbinding processing.

As explained above, by virtue of this embodiment, even if a sheet such as a transparent film that cannot be reversed is used as a front cover, it is possible to obtain a resulting document for which visual quality thereof is not changed.

In addition, by virtue of this embodiment, when performing bookbinding and saddle stitching processing, it is possible to change a print order of image data and a method of discharging of a front cover and a body in accordance with the existence/absence of a front cover, the type of a sheet to be used for the front cover, and whether or not sheet reverse and discharge can be performed for a sheet used for the front cover.

Other Embodiment

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-075469, filed Apr. 1, 2015, which is hereby incorporated by reference herein in its entirety.

What is claimed is:

1. A printing apparatus comprising:
an image forming unit that forms an image on a body sheet and forms an image on a cover sheet, wherein the image forming unit comprises a reversing mechanism that reverses and discharges the cover sheet;
a saddle finisher that receives the body sheet and the cover sheet from the image forming unit, performs a bookbinding process on a sheet bundle including the body sheet and the cover sheet; and
a controller that controls the image forming unit:
(i) in a case that the cover sheet is a first type of sheet, to form a normal image on the cover sheet after forming the image on the body sheet and to convey the cover sheet on which the normal image has been formed to the saddle finisher without reversing the cover sheet,
(ii) in case that the cover sheet is a second type of sheet that has a higher transparency than the first type of sheet and is able to be reversed by the reversing mechanism, to form a mirror image on the cover sheet after forming the image on the body sheet and to convey the cover sheet on which the mirror image has been formed to the saddle finisher by reversing the cover sheet using the reversing mechanism, and
(iii) in a case that the cover sheet is a third type of sheet that has a higher transparency than the first type of sheet and is not able to be reversed by the reversing mechanism, to form a normal image on the cover sheet after forming the image on the body sheet and to convey the cover sheet on which the normal image has been formed to the saddle finisher without reversing the cover sheet.

2. The printing apparatus according to claim 1, further comprising a console unit that is operable to cause a user to input information regarding a type of the cover sheet, wherein the controller determines the type of the cover sheet based on the information.

3. The printing apparatus according to claim 2, wherein the information regarding the type of the cover sheet includes information regarding a thickness of the cover sheet.

4. The printing apparatus according to claim 2, wherein the information regarding the type of the cover sheet includes information regarding a grammage of the cover sheet.

5. The printing apparatus according to claim 2, wherein the information regarding the type of the cover sheet includes information regarding a color of the cover sheet.

6. The printing apparatus according to claim 2, wherein the information regarding the type of the cover sheet includes information regarding a surface property of the cover sheet.

7. The printing apparatus according to claim 2, wherein the information regarding the type of the cover sheet includes information regarding a gloss of the cover sheet.

8. The printing apparatus according to claim 1, wherein the saddle finisher comprises:
 a stacking unit that stacks the sheet bundle including the body sheets and the cover sheet;
 a protrusion member; and
 a folding roller,
 wherein the saddle finisher presses a center of the sheet bundle stacked on the stacking unit using the protrusion member into the folding roller to perform the bookbinding process.

9. The printing apparatus according to claim 1, further comprising:
 a scanner that reads a plurality of originals,
 wherein the image forming unit forms images on the body sheet and the cover sheet based on image data obtained by reading the plurality of originals by the scanner.

10. The printing apparatus according to claim 1, wherein the controller causes the reversing mechanism to convey the body sheets to the saddle finisher without reversing the body sheets.

11. The printing apparatus according to claim 1, further comprising a plurality of sheet storage units that respectively store a sheet, wherein a first sheet storage unit of the plurality of sheet storage units stores the body sheets and a second sheet storage unit of the plurality of sheet storage units stores the cover sheet.

12. A printing apparatus connected to a saddle finisher that receives a body sheet and a cover sheet from a printing apparatus, and performs a bookbinding process on a sheet bundle including the body sheet and the cover sheet, the printing apparatus comprising:
 an image forming unit that forms an image on the body sheet and forms an image on the cover sheet, wherein the image forming unit comprises a reversing mechanism that reverses and discharges the cover sheet; and
 a controller that control the image forming unit:
  (i) in a case that the cover sheet is a first type of sheet, to form a normal image on the cover sheet after forming the image on the body sheet and to convey the cover sheet on which the normal image has been formed to the saddle finisher without reversing the cover sheet,
  (ii) in a case that the cover sheet is a second type of sheet that has a higher transparency than the first type of sheet and is able to be reversed by the reversing mechanism, to form a mirror image on the cover sheet after forming the image on the body sheet and to convey the cover sheet on which the mirror image has been formed to the saddle finisher by reversing the cover sheet using the reversing mechanism, and
  (iii) in a case that the cover sheet is a third type of sheet that has a higher transparency than the first type of sheet and is not able to be reversed by the reversing mechanism, to form a normal image on the cover sheet after forming the image on the body sheet and to convey the cover sheet on which the normal image has been formed to the saddle finisher without reversing the cover sheet.

* * * * *